(12) United States Patent
Reinhardt

(10) Patent No.: US 6,571,081 B1
(45) Date of Patent: May 27, 2003

(54) HYBRIDIZED SPACE/GROUND BEAM FORMING

(75) Inventor: Victor S. Reinhardt, Rancho Palos Verdes, CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/305,269

(22) Filed: May 4, 1999

(51) Int. Cl.[7] .............................................. H04B 7/185
(52) U.S. Cl. ...................... 455/12.1; 455/13.3; 455/427
(58) Field of Search ............................... 455/12.1, 13.2, 455/13.3, 427, 430, 428, 429

(56) References Cited

U.S. PATENT DOCUMENTS

| | | | | |
|---|---|---|---|---|
| 4,901,085 A | | 2/1990 | Spring et al. ................ | 342/373 |
| 4,931,802 A | * | 6/1990 | Assal et al. .................. | 342/356 |
| 5,132,694 A | | 7/1992 | Sreenivas .................... | 342/373 |
| 5,220,320 A | * | 6/1993 | Assal et al. ............. | 340/825.79 |
| 5,566,168 A | * | 10/1996 | Dent .......................... | 455/13.3 |
| 5,589,834 A | * | 12/1996 | Weinberg .................... | 342/354 |
| 5,736,959 A | * | 4/1998 | Patterson et al. ........... | 455/13.3 |
| 5,784,030 A | * | 7/1998 | Lane et al. ................. | 342/373 |
| 5,835,487 A | * | 11/1998 | Campanella ................ | 455/12.1 |
| 5,943,324 A | * | 8/1999 | Ramesh et al. ............ | 455/12.1 |

FOREIGN PATENT DOCUMENTS

| | | |
|---|---|---|
| EP | 0 446 610 A1 | 9/1991 |
| EP | 0 860 952 A | 8/1998 |
| JP | 08037482 | 2/1996 |

\* cited by examiner

*Primary Examiner*—Thanh Cong Le
*Assistant Examiner*—Thuan T. Nguyen
(74) *Attorney, Agent, or Firm*—V. D. Duraiswamy; M. W. Sales

(57) ABSTRACT

An apparatus for reducing the amount of circuitry required to process satellite communication signals uses a beamformer to reduce the number of signals coupled to the communications circuitry, thereby reducing the amount of communication circuitry required to process received signals.

36 Claims, 4 Drawing Sheets

HYBRIDIZED SPACE/GROUND BEAM FORMING

BACKGROUND OF THE INVENTION (a) Field of the Invention

The present invention relates in general to satellite communications and, more particularly, to an apparatus for reducing satellite payload complexity when using ground based beam forming.

(b) Description of Related Art

Some satellite communication systems allow multiple ground users to relay data, voice, and other signals over broad geographic regions. In particular, cellular-based satellite communication systems have become especially popular for commercial applications such as telephony because the number of users that can be accommodated within a given geographic region can be greatly expanded beyond that provided by conventional single channel communication systems.

Cellular communications utilize multiple beam antennas and multiple satellite channels to sub-divide a geographic region into a plurality of individual cells. Each cell within the geographic region may be assigned a frequency sub-band selected from a predetermined set of frequency sub-bands. Assignment of the frequency sub-bands typically follows a repeating pattern that results in no two adjacent cells having the same frequency sub-band assignment. This reuse of frequency sub-bands greatly expands the number of users that can be accommodated within a given geographic region. In a typical telephony application a bandwidth B may be divided into p sub-bands each having a bandwidth of B/p. If a region is sub-divided into N' cells then each sub-band can be reused N'/p times. Thus, the total number of users that can be accommodated within the region is (N'/p) *(B/b), where b is the bandwidth of an individual user and the quantity N'/p represents the expansion factor provided by using a cellular-based communication system. For example, If N'=154, p=4, B=30 MHz, and b=6 KHz then the expansion factor equals 38.5 and the total number of possible users equals 192,000. In contrast, a single channel communication system covering the same region would have an expansion factor of 1 and could only accommodate 192,000/38.5 or approximately 5000 users.

To meet system interference requirements, cellular-based communication systems depend on low crosstalk between nearby cells that have been assigned the same frequency sub-band. In practice, the multiple beam antennas that are often used in cellular systems utilize a single reflector or lens and a group of tightly packed feeds in the antenna's focal plane. These tightly packed feeds create an inherent interference problem because the individual feeds have sidelobes exceeding system interference requirements. Several approaches to reducing this interference to acceptable levels are generally known in the art.

The effects of inter-cell interference due to imperfect feed characteristics can be reduced to acceptable levels by using beam forming systems. Beam forming systems synthesize an improved cell antenna pattern, having the required interference properties, by combining the weighted outputs of multiple feeds. These beam forming systems are usually on board the satellite or within a ground station of the cellular system.

Space-based beam forming systems perform the beam forming on board the satellite. Thus, the hardware associated with spaced-based beam forming systems is carried as a payload on board the satellite. There are several problems with space-based beam forming systems. Namely, conventional beam forming hardware consumes a large amount of electrical power, which is highly undesirable on board a satellite. Furthermore, beam forming hardware is heavy and occupies a significant amount of space, which is also undesirable because it significantly increases satellite production and launch costs.

Ground-based beam forming systems place the beam forming hardware within a ground station of the cellular system. These ground-based systems have the inherent advantage of not being subject to the weight and power restrictions found on board the satellite.

Conventional ground-based beam forming systems transmit individual feed signals from the satellite's receive antenna to the ground station via an additional gateway frequency band that contains tightly packed sub-bands. In a similar manner, the feed signals for the satellite's transmit antenna are sent up through another gateway frequency band after the feed signals are generated in the ground station from the beam inputs.

Conventional ground-based beam forming systems have reduced the cost, weight, and power consumption issues associated with having complex, dynamic beam forming hardware on board the satellite by moving this hardware to the ground station. Despite the benefits of ground-based beam forming, conventional systems still require a large amount of transmit and receive hardware to pass the individual feed signals through gateway uplinks and downlinks to and from the ground station. This transmit and receive hardware is carried on board the satellite as payload and is undesirable because of the weight, cost, and power consumption that it entails. The problem of satellite transmit and receive hardware payload complexity is compounded by the fact that using the aforementioned beam forming techniques to compensate for imperfect feed characteristics requires more feeds than would be required if feed patterns were ideal. For example, a circular region divided into N' cells would require $N=(\sqrt{N'}+\sqrt{M})^2$ cells, where M equals the number of feeds used in synthesizing each beam. Thus, if N'=154 and M=50 then N=380 feeds.

Transmit and receive hardware payload complexity, and thus, its weight and cost, is a highly sensitive function of the number of feed signals that are transmitted across the satellite's gateway links. To properly implement a ground-based beam forming system, each feed signal must be channelized into all of the sub-bands used in the particular cellular system. Furthermore, additional redundant transmit and receive processing channels are typically provided for each feed signal. For example, if the cellular system utilizes four sub-bands and includes two redundant processing channels then each feed signal requires six channels of receive hardware for the user uplinks and six channels of transmit hardware for the user downlinks. Therefore, it can be immediately appreciated that reducing the number of feeds transmitted via the gateway links to and from the beam forming ground station can dramatically reduce the complexity of the satellite's transmit and receive hardware payload.

SUMMARY OF THE INVENTION

In accordance with the present invention, a satellite communications payload includes a set of user feeds coupled to a beam forming network. The beam forming network associates the feeds with a set of beamlets such that there are fewer beamlets than feeds. A multi-channel payload coupled to the beam forming network processes the beamlets.

The invention itself, together with further objects and attendant advantages, will best be understood by reference to the following detailed description, taken in conjunction with the accompanying drawings.

DESCRIPTION OF THE PREFERRED EMBODIMENTS

Figure 1:
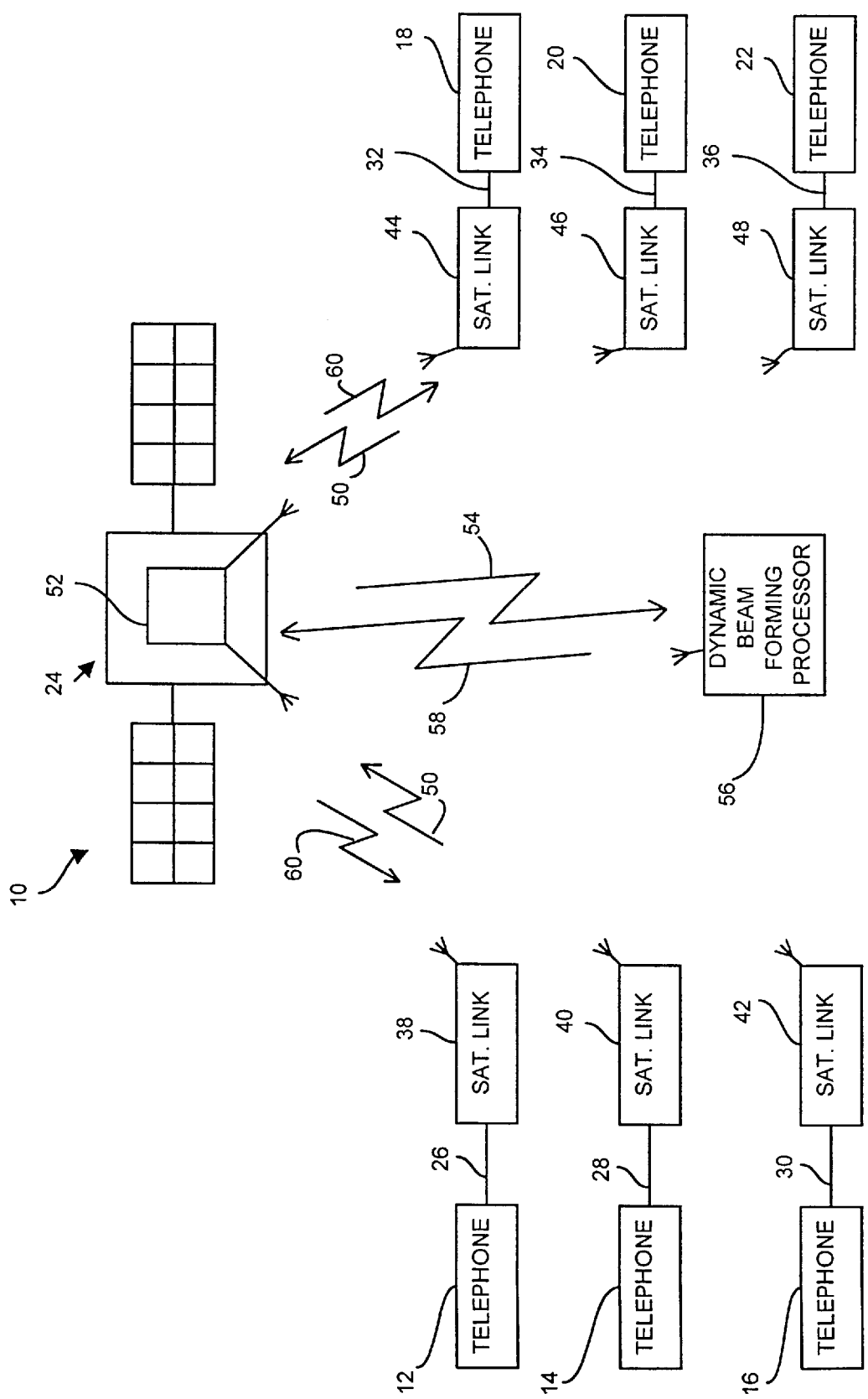
FIG. 1 is an illustration of a satellite communication system within which aspects of the present invention may be embodied.

Illustrated in FIG. 1 is a satellite communications system 10 within which aspects of the present invention may be utilized. A plurality of users at remotely disposed locations may use telephones 12–22 to communicate with each other via a communications satellite 24. Each of the telephones 12–22 may be connected via conventional public switched telephone networks PSTNs 26–36 to respective satellite link or ground stations 38–48. For example, a first user using a telephone 12 may converse with a second user at the remotely located telephone 18. As the first user at telephone 12 speaks, his voice may be transferred, via the PSTN 26, to a first satellite link or ground station 38. In a known manner, the first satellite link station 38 encodes and upconverts the user's voice for uplink to the communications satellite 24 via user uplinks 50.

A communications payload 52 of the satellite 24 processes the information uplinked from the first satellite link station 38 into a bandwidth-efficient format. This conversion process is well known in the current art. After the information is converted, it is downlinked via gateway downlinks 54 to a dynamic beam forming processor 56 located on the ground. The beam forming processor 56 processes the information received via the gateway downlinks 54 using known beam forming algorithms and uplinks the processed information to the satellite 24 via the gateway uplinks 58. The payload 52 then transmits, via user downlinks 60, the processed information to a second satellite link station 44. The second satellite link station 44 performs the function of recovering the information originally sent from the first satellite link station 38. Once the data is recovered, the second satellite link station 44 transfers the information to the telephone 18, via the PSTN connection 32. This satellite communication process takes place from a number of geographic areas using a number of different frequencies. Although the system shown in FIG. 1 is applicable to telephony transmissions in particular, it should be understood that the present invention is applicable to a wide variety of satellite communications systems other than telephony.

Figure 2:
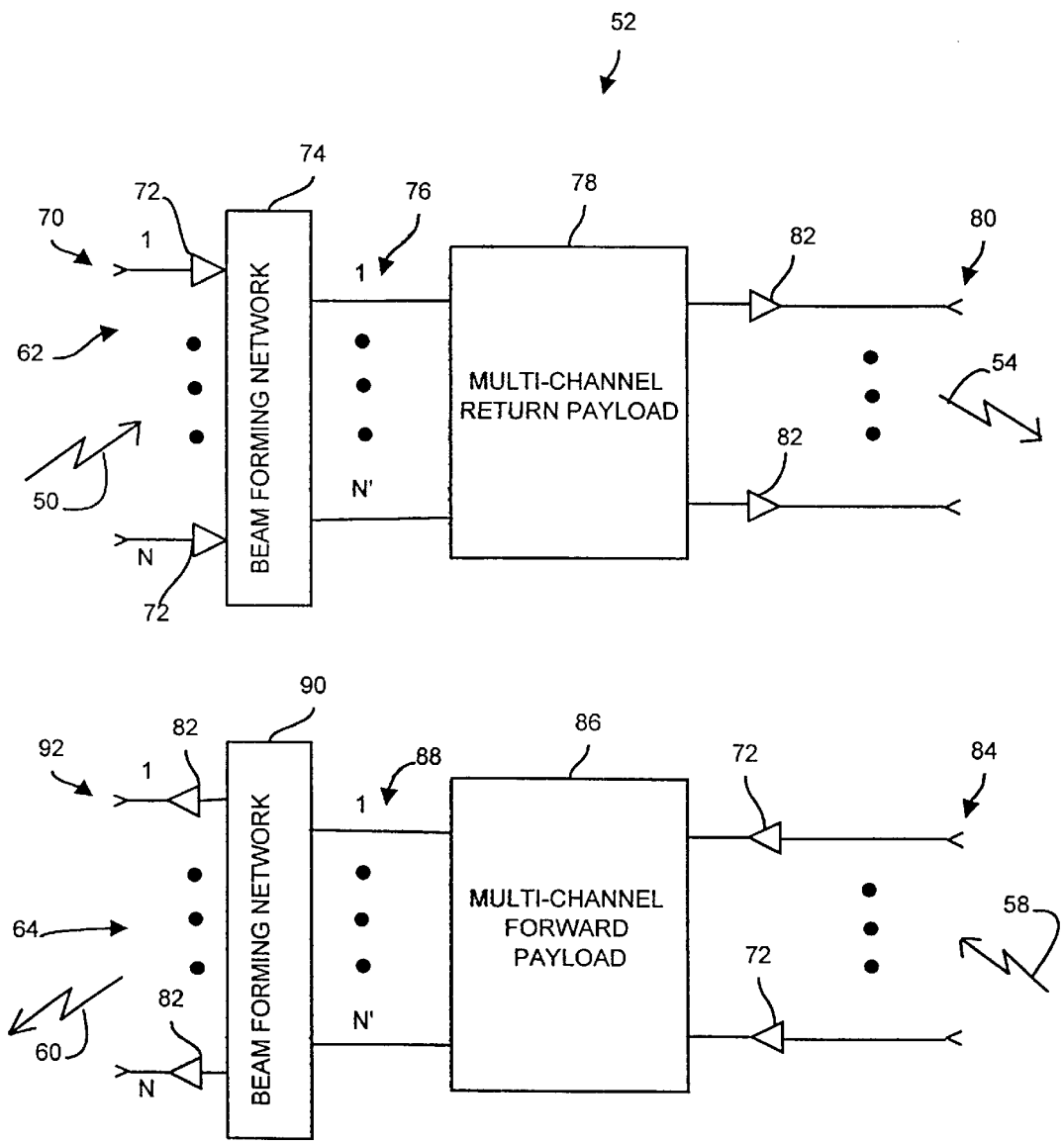
FIG. 2 is a block diagram illustrating a communications payload in accordance with aspects of the present invention.

By way of example only, FIG. 2 provides a more detailed block diagram of the communications payload 52, within which aspects of the present invention are embodied. The communications payload 52 includes a user uplinks sub-section 62 and a user downlinks sub-section 64.

The user uplinks sub-section 62 includes a plurality of (N) user uplink feeds 70 coupled to low noise amplifiers (LNAs) 72, a user uplinks beam forming network 74, a plurality of (N') intermediate uplink beamlet signals 76, a multi-channel return payload 78, and a plurality of gateway downlink feeds 80 that are driven by power amplifiers 82.

Signals are transmitted from the satellite ground stations 38–48, via the user uplinks 50 to the user uplink feeds 70 of the payload 52. The user uplink feeds 70 couple the transmitted signals through LNAs 72 to the user uplinks beam forming network 74. The user uplinks beam forming network 74 synthesizes the individual feed signals into the plurality of intermediate uplink beamlets 76. Multiple feed signals are used to synthesize each of the intermediate uplink beamlet signals 76, and there are fewer intermediate uplink beamlets 76 than uplink feed signals. For example, if there are N uplink feeds 70 the user uplink beam forming network 74 may synthesize N' intermediate uplink beamlets 76. The ratio N/N' may typically be greater than two to one but could be much higher depending on the particular feed design and/or configuration used. In addition, the intermediate uplink beamlets 76 are synthesized so that the crosstalk between intermediate uplink beamlets 76 is significantly lower than the crosstalk between uplink feed signals. This allows a smaller number of uplink beamlets, having more ideal interference characteristics, to represent the geographic area covered by the user uplink feeds.

The intermediate uplink beamlet signals 76 are processed by the multi-channel return payload 78. The multi-channel return payload channelizes and frequency shifts the intermediate uplink beamlets 76 into tightly a packed bandwidth of gateway sub-bands. The tightly packed signals are coupled through the power amplifiers 82 to the gateway downlink feeds 80 for transmission via the gateway downlinks 54 to the ground-based beam forming processor 56 (shown in FIG. 1).

The apparatus and operation of the user downlinks sub-section 64 is analogous to that of the user uplinks sub-section 62. Tightly packed gateway signals are received via the gateway uplinks 58 and are coupled from a plurality of gateway uplink feeds 84, through LNAs 72, to a multi-channel forward payload 86. The multi-channel forward payload 86 recomposes a plurality of intermediate downlink beamlets 88 that contain substantially the same information as contained within the user uplinks 50. The intermediate downlink beamlets 88 are passed through a user downlinks beam forming network 90 that may be similar or identical to the user uplinks beam forming network 74. The user downlinks beam forming network 90 recomposes a plurality of user downlink feed signals that are amplified by power amplifiers 82 and coupled through a plurality of user downlink feeds 92. User downlink feeds 92 transmit the user downlink feed signals, via the user downlinks 60, to one of the satellite ground stations 38–48.

It is important to recognize that, in accordance with the present invention, the multi-channel return payload processes the intermediate beamlets 76 for transmission to the ground-based beam forming station 56 rather than directly processing the signals from the user uplink feeds 70. Thus, a large amount of channelizing hardware within the multi-channel return payload 78 can be eliminated with respect to the amount of hardware that would be required to directly process and channelize feed signals received from all user uplink feeds 70. The hardware complexity of the multi-channel forward payload 86 can be similarly reduced because it also processes and de-channelizes beamlets rather than the larger number of feed signals directly. Thus, the user uplink and downlink beam forming networks 74, 90 of the present invention interpose between the user feeds 70, 92 and the multi-channel return and forward payloads 78, 86 of the satellite 24. These interposing beam forming networks 74, 90 reduce the number of signals processed by the multi-channel return and forward payloads 78, 86, which significantly reduces the hardware complexity of these payloads. This reduction in complexity greatly reduces the power requirements, size, cost, and weight of the satellite's 24 overall hardware payload.

Figure 3:
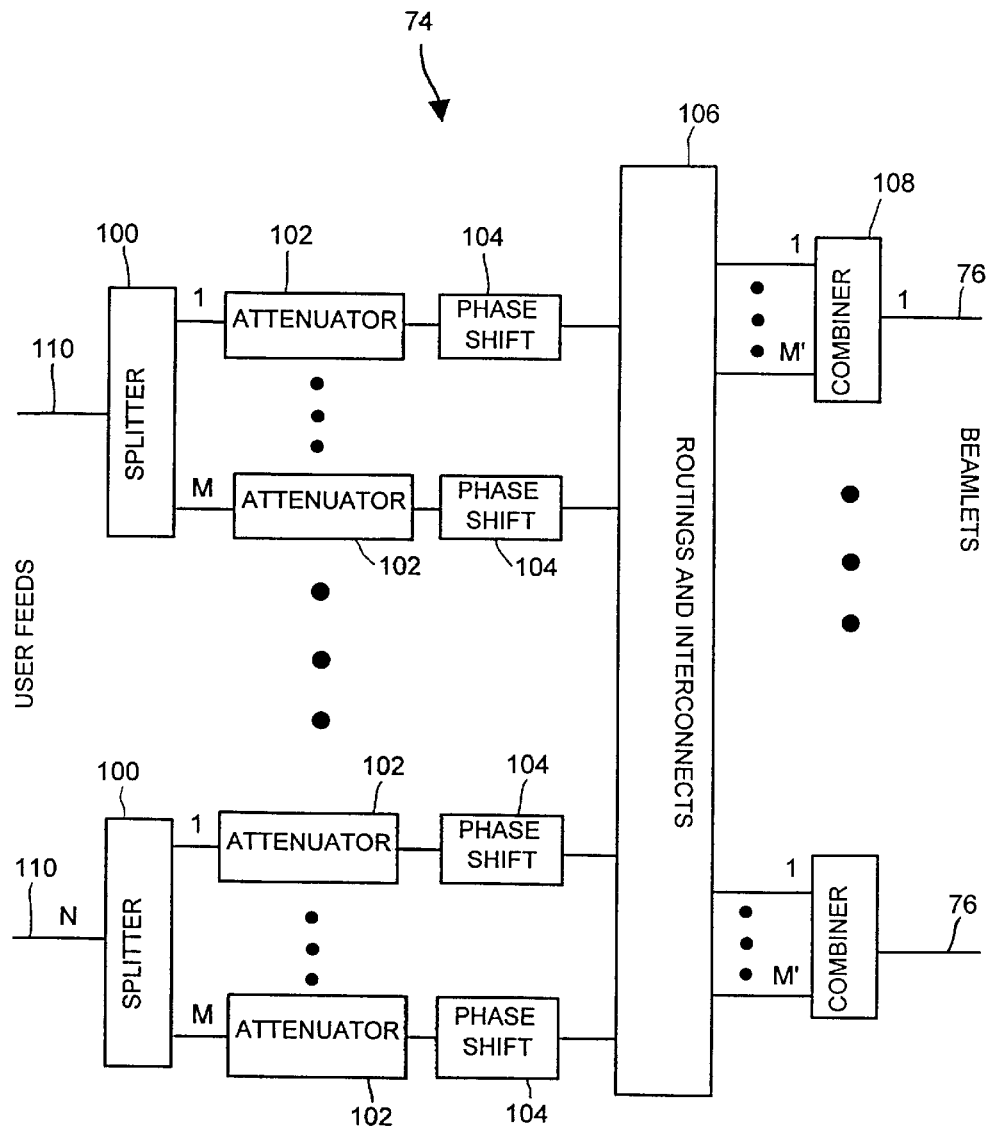
FIG. 3 is a block diagram of a beam forming network in accordance with the present invention.

Now turning to FIG. 3, a more detailed block diagram of the user uplinks beam forming network 74 is shown. The user uplinks beam forming network 74 includes a plurality of power splitters 100, a plurality of attenuators 102, a plurality of phase shift blocks 104, a signal routing and interconnections block 106, and a plurality of power combiners 108, all preferably arranged as shown. The various components of the user uplinks beam forming network 74 are generally known in the art and may be purchased as complete components and/or fabricated using waveguide technology, coaxial technology, or multi-layer printed wiring board technology, which are also known in the art. It should be appreciated that such beam forming networks may be made from passive components that do not require a DC power source for operation, which is a highly desirable characteristic for satellite hardware payloads. Alternatively, a wide variety of passive and/or active components may be utilized to perform the various functions of the beam forming networks 74, 90 without departing from the spirit of the invention.

The splitters 100 receive amplified user feed signals 110 from the LNAs 72 (shown in FIG. 2) and divide each of these incoming feed signals 110 equally M ways, where M is the number of beamlets that each feed signal is routed to. For example, if a given feed is used in forming ten of fifty total beamlets (i.e. M=10) then the splitter associated with that feed divides the incoming feed signal ten ways. The attenuators 102 and phase shift blocks 104 are used to generate a series of weighted terms based on the split feed signals. The particular weighting coefficients (i.e. phase and amplitude) are preferably selected a priori (but could also be adjusted dynamically) to produce an optimal set of terms that are used to form, via the combiners 108, the intermediate beamlets 76. The routings and interconnections block 106 routes the various weighted terms to the appropriate combiners 108 for summation. The routings and interconnections block 106 may be made from waveguide cables, multi-layer printed wiring boards, or other known techniques. The combiners 108 each receive M' weighted terms for summation, where each of the M' terms is a weighted term associated with one of the user feed signals 110. For example, each of the combiners may sum twenty (i.e. M'=20) weighted feed signals to produce each of the intermediate beamlets 76. Typically, each beamlet is the summation of a plurality of weighted feeds signals such that the interference of the original feed signals is substantially reduced. As is well known in the art, the sidelobes of a given feed signal may be substantially reduced or canceled by using other feeds having a main lobe aligned with the side lobes of the given feed signal. These other feeds may attenuated and phase shifted (e.g. 180° or out of phase) so that the main lobes when added in the combiners cancel the side lobes of the given feed signal. To achieve a desired final interference level, shaping the intermediate beamlets 76 may require the combination of many weighted terms.

The user downlinks beam forming network 90 is preferably identical to the user uplinks beam forming network 76. In operation, signals pass through the user downlinks beam forming network 90 in a direction opposite that of those in the user uplinks beam forming network 76. The beam forming networks 76, 90 may be fabricated using linear passive components, thereby providing reciprocal transfer functions for signals passing through them in one direction or the other. Namely, the intermediate downlink beamlets 88 pass through the user downlinks beam forming network 90 and are recomposed into a plurality of individual feed signals for transmission to the ground stations 38–48 via the user downlinks 60.

Figure 4:
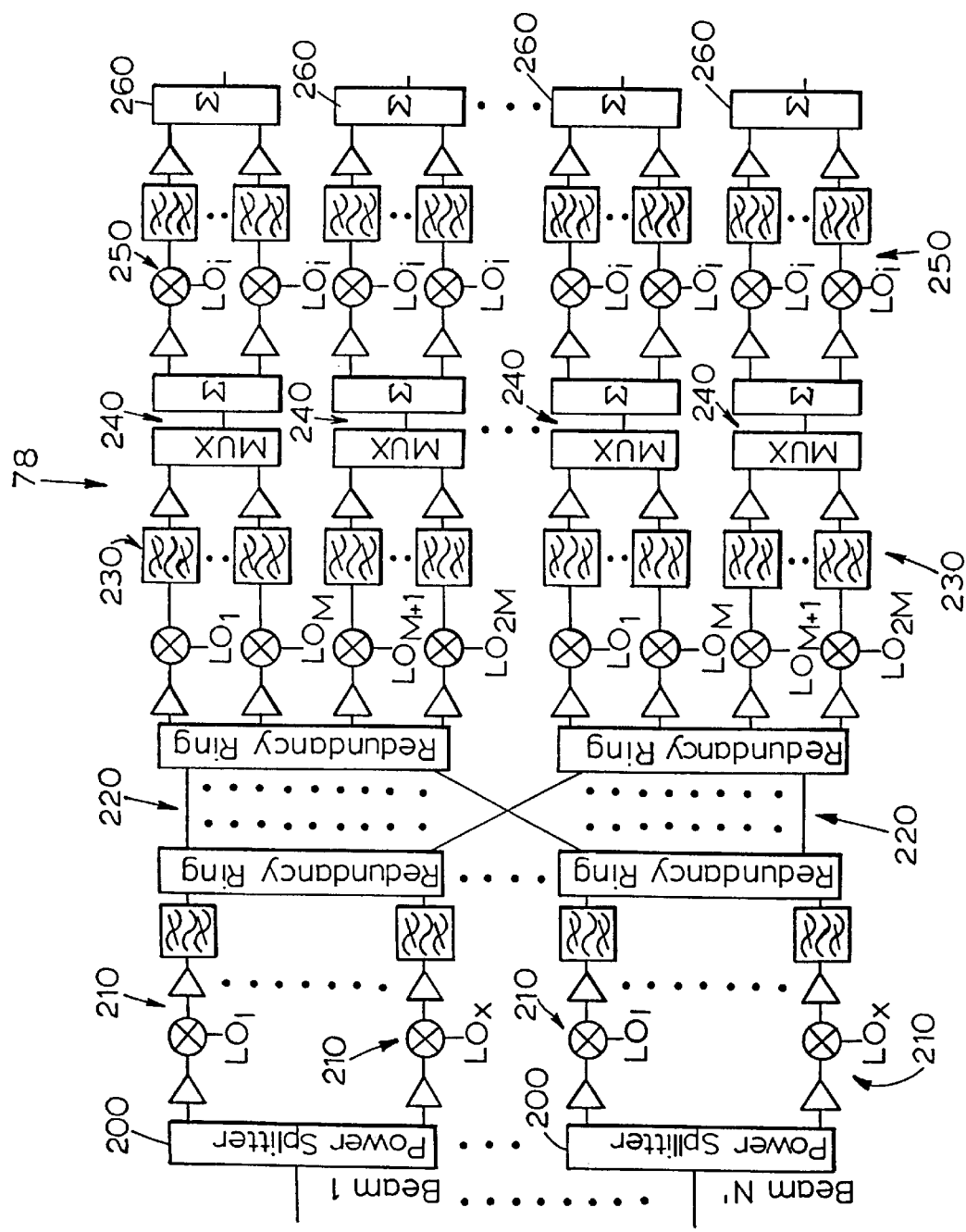
FIG. 4 is a block diagram of a multi-channel return payload that may be utilized with the present invention.

Illustrated in FIG. 4 is a more detailed block diagram of the multi-channel return payload 78 that may be utilized with the present invention. Although the multi-channel return payload 78 is described below, it should be noted that it is only exemplary of communications hardware that is well known in the art. Also, the forward payload 88 is not described in detail because its apparatus and function are analogous to the return payload 78 and is similarly known in the art.

The multi-channel return payload 78 includes power splitters 200, a first series of amplifier/mixer/filter stages 210, a plurality of redundancy rings 220, a second series of amplifier/mixer/filter stages 230, a series of multiplexer/summer stages 240, a third set of amplifier/mixer/filter stages 250, and a final series of summers 260, all preferably arranged as shown.

The intermediate uplink beamlet signals 76 from the user uplinks beam forming network 74 are coupled to the power splitters 200, which divide the input power evenly among the amplifier/mixer/filter stages 210. Each of the mixers may be operated at a different local oscillator frequency to allow for the demodulation of any of the possible frequency sub-bands associate with the cellular system 10. The amplifier/mixer/filter stages 210 are each coupled to the redundancy rings 220, which are switch networks that allow for selective coupling between the first series of amplifier/mixer/filter stages 210 and the second series of amplifier/mixer/filter stages 230. The second series of amplifier/mixer/filters stages 230 downconvert the signals to a second intermediate frequency (IF). The downconverted signals are then coupled to the multiplexer/summer stages 240. The third series of ampifier/mixer/filter stages 250 mixes the signals with another IF for transmission to the ground station via the gateway downlinks 54.

Of course, it should be understood that a range of changes and modifications can be made to the preferred embodiment described above. For example, the present invention may also be utilized in conjuction with phased array antennas without departing from the spirit of the invention. It is therefore intended that the foregoing detailed description be regarded as illustrative rather than limiting and that it be understood that it is the following claims, including all equivalents, which are intended to define the scope of this invention.

What is claimed is:

1. A satellite communications payload comprising;
   a first set of feeds;
   a first beam forming network coupled to the first set of feeds and adapted to associate the first set of feeds with a first set of intermediate beamlets such that the first set of intermediate beamlets has fewer members than the first set of feeds; and
   a first multi-channel payload coupled to the beam forming network and adapted to process the first set of intermediate beamlets.

2. The apparatus of claim 1, wherein the first beam forming network comprises splitters, attenuators, phase shift elements, and combiners.

3. The apparatus of claim 2, wherein the splitters divide each of the first set of feeds M ways, where M is the number of intermediate beamlets that each feed is routed to.

4. The apparatus of claim 2, wherein the attenuators and phase shift elements generate a series of weighted terms.

5. The apparatus of claim 2, wherein the combiners each receive M' weighted terms for summation, wherein each of the M' terms is a weighted term associated with one of the first set of feeds.

6. The apparatus of claim 1, wherein the first beam forming network includes passive components.

7. The apparatus of claim 1, wherein the first beam forming network includes active components.

8. The apparatus of claim 1, wherein the number of feeds is greater than the number of intermediate beamlets.

9. The apparatus of claim 1, wherein the first set of feeds is associated with user uplinks.

10. The apparatus of claim 9, wherein the first multi-channel payload is a return payload.

11. The apparatus of claim 1, wherein the first set of feeds is associated with user downlinks.

12. The apparatus of claim 11, wherein the first multi-channel payload is a forward payload.

13. The apparatus of claim 1, further comprising:
a second set of feeds;
a second beam forming network coupled to the second set of feeds and adapted to associate the second set of feeds with a second set of intermediate beamlets such that the second set of intermediate beamlets has fewer members than the second set of feeds; and
a second multi-channel payload coupled to the second beam forming network and adapted to process the second set of intermediate beamlets.

14. The apparatus of claim 13, wherein the second beam forming network comprises splitters, attenuators, phase shift elements, and combiners.

15. The apparatus of claim 13, wherein the second beam forming network includes passive components.

16. The apparatus of claim 13, wherein the second beam forming network includes active components.

17. The apparatus of claim 13, wherein the number of feeds is greater than the number of beamlets.

18. The apparatus of claim 13, wherein the first set of feeds is associated with user uplinks and the second set of feeds is associated with user downlinks.

19. The apparatus of claim 13, wherein the first and second beam forming networks are substantially identical.

20. The apparatus of claim 13, wherein the first and second sets of intermediate beamlets have the same number of members.

21. The apparatus of claim 13, wherein the first multi-channel payload is associated with a gateway downlink.

22. The apparatus of claim 13, wherein the second multi-channel payload is associated with a gateway uplink.

23. The apparatus of claim 13, wherein the second beam forming network is made from passive components.

24. The apparatus of claim 13 wherein the second set of intermediate beamlets are recomposed into the second set of feeds.

25. The apparatus of claim 1 wherein each one of the first set of intermediate beamlets is the summation of a plurality of the first set of feeds.

26. A satellite communication system, comprising:
a satellite having a multi-channel return payload and a multi-channel forward payload;
a first set of user feeds;
a second set of user feeds;
an user uplink beam forming network interposed between said first set of user feeds and said multi-channel return payload, wherein said user uplink beam forming network synthesizes signals from said first set of user feeds to form intermediate beamlets for processing by said multi-channel return payload, the intermediate beamlets being fewer in number than the total number of the signals from said first set of user feeds;
a ground-based beam forming processor for receiving processed signals from said multi-channel return payload and uplinking gateway signals to said multi-channel forward payload; and
an user downlink beam forming network interposed between said multi-channel forward payload and said second set of user feeds for receiving a plurality of downlink beamlets from said multi-channel forward payload and recomposing a plurality of downlink user downlink feed signals for coupling through said second set of user feeds.

27. The system of claim 26, wherein the user uplink beam forming network includes a plurality of power splitters for dividing each of the first set of feeds into M split feeds, where M is the number of intermediate beamlets that each feed is routed to.

28. The apparatus of claim 26, wherein the user uplink beam forming network includes attenuators and phase shift elements for generating a series of weighted terms.

29. The apparatus of claim 26, wherein the user uplink beam forming network includes combiners for summing weighted feed signals to produce said intermediate beamlets.

30. A satellite communication method, comprising:
receiving, at the satellite, N user uplink feed signals, where N is an integer;
forming N' intermediate beamlets from said N user feed signals, where N is greater than N';
processing the intermediate beamlets for transmission to ground as gateway downlink signals;
processing the gateway downlink signals in a beam forming processor on the ground to form gateway uplink feed signals;
uplinking the gateway uplink feed signals to said satellite;
at the satellite, recomposing the gateway uplink feed signals to form a second set of intermediate beamlets;
processing the second set of intermediate signals to form a plurality of user downlink feed signals, where the total number of user downlink feed signals is greater than the total number of the second set of intermediate beamlets, and
transmitting the user downlink feed signals to ground.

31. The method of claim 30, wherein the step of forming the intermediate beamlets comprises synthesizing the N user uplink feed signals so that the crosstalk between the intermediate beamlets is lower than the crosstalk between the N user uplink feed signals.

32. The method of claim 30, wherein the ratio of N/N' is greater than two to one.

33. A method of processing signals in a multi-channel satellite payload, comprising:
synthesizing received user uplink signals, in an uplink beam forming network, to form a total number of intermediate beamlets that are fewer in number than the total number of received user uplink signals, wherein each one of the intermediate beamlets is the summation of a plurality of the received user uplink signals, and providing the intermediate beamlets for further processing to the multi-channel satellite payload.

34. The method of claim 33, wherein each one of the user uplink signals has a main lobe and side lobes, and the step of synthesizing comprises substantially reducing the side lobes of one of the plurality of the received user uplink signals by using another one or more of the plurality of the received user uplink signals having a main lobe aligned with the side lobes of the one of the plurality of the received user uplink signals.

35. The method of claim 34, further comprising attenuating and phase shifting the another one or more of the plurality of the received user uplink signals so that the main lobes when added cancel the side lobes of the one of the plurlity of the received user uplink signals.

36. The method of claim 35, further comprising shaping the intermediate beamlets to achieve a desired interference level.

* * * * *